Feb. 3, 1959 H. T. GOLDE ET AL 2,872,243
LOCK FOR A VEHICLE ROOF
Filed Feb. 21, 1957

Feb. 3, 1959 H. T. GOLDE ET AL 2,872,243
LOCK FOR A VEHICLE ROOF
Filed Feb. 21, 1957 2 Sheets-Sheet 2

United States Patent Office 2,872,243
Patented Feb. 3, 1959

2,872,243

LOCK FOR A VEHICLE ROOF

Hans T. Golde, Frankfurt am Main, and Johannes K. Werner, Offenbach am Main, Germany Application February 21, 1957, Serial No. 641,563

Claims priority, application Germany August 9, 1956

10 Claims. (Cl. 296—137)

This invention relates to sliding or convertible roofs for motor vehicles and more particularly to lock constructions for displaceable roofs.

An object of the invention is to provide a lock, the mechanical parts of which can be used, without special adjustment, in different types of vehicles regardless of the chamber of the roof and regardless of the specifications of the employed roofing material, such as, for example, its resilience. A further object of the invention is to minimze the force required in locking and unlocking a convertible roof.

In accordance with the invention, a mechanism for a convertible roof or the like is provided with a cap which is vertically adjustable and which is swingably mounted about a transverse axis, the roof covering being attached to the cap. The combined movements are effected, according to the invention, by means of a special system of levers which overcome the tolerances and defects of top coverings available on the market, such that friction and jamming are eliminated or reduced to such an extent that the torque necessary for the operation remains uniform and within minimal limits.

Other objects and structural details of the invention will be apparent from the following descripton and accompanying drawings illustrating an embodiment of the invention and wherein.

Figure 3:
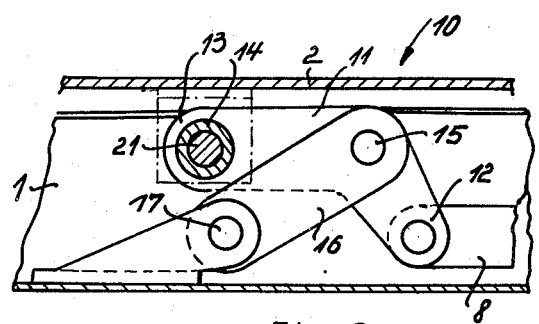
Fig. 3 is a view of the details of the lever system taken on the line III—III of Fig. 4.
Figure 4:
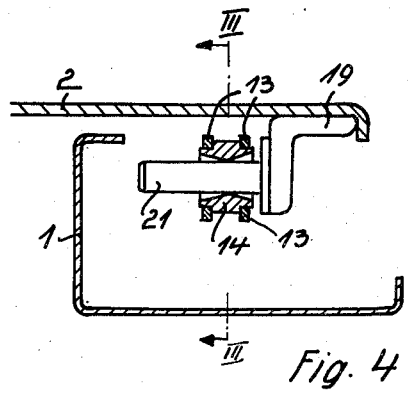
Fig. 4 is a view of a further detail, to wit, of the connection between the lever system and the cap.
Figure 7:
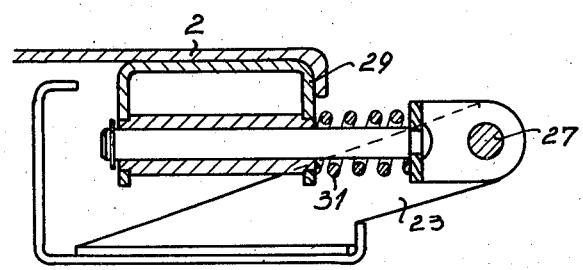
Figure 6:
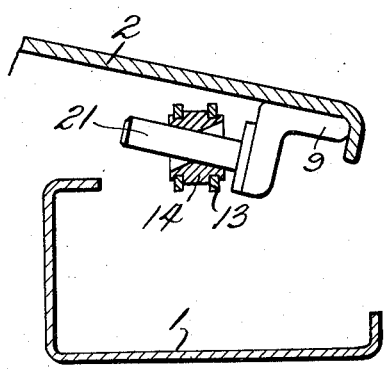
Figure 8:
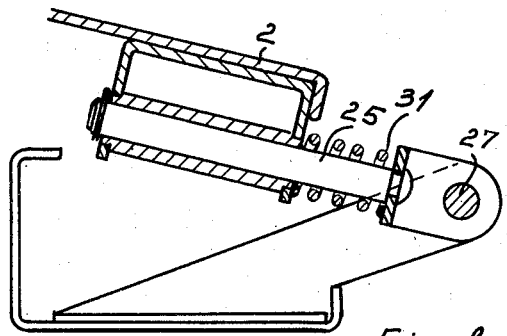
Figure 9:
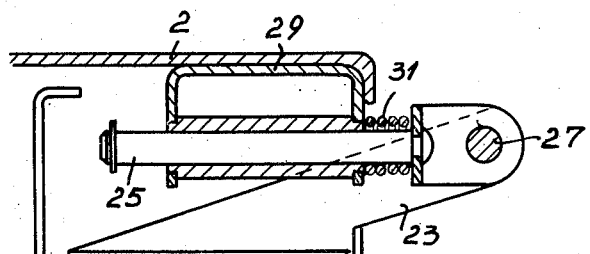
Figure 5:
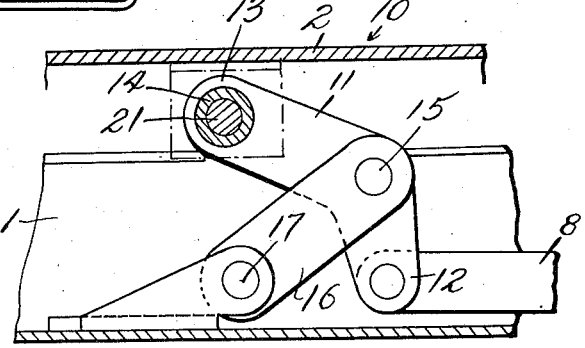

Figs. 5 and 6 are views corresponding to the illustrations of Figs. 3 and 4, with the cap raised, and Figs. 7, 8 and 9 are views of the mounting of the cap on the mechanism.

Referring next to the drawings, a front lock for the sliding roof of a motor vehicle is, according to the invention, provided with a cap 2 mounted on a brace 1. The brace slides in known manner by means of rollers 3 in guides of the roof frame (not shown) in the direction of the longitudinal axis of the vehicle.

The brace 1 is provided with a cam disk 5 which is controlled by a handle 4 and which operates a locking hook 6. By operation of the handle 4, two rods 7 and 8 may be simultaneously moved towards or away from the center line of the vehicle in the directions shown by arrows A. This actuates a lever system controlling the position of cap 2.

The lever system has a symmetrical design, in that each rod 7 or 8 controls a crank lever mechanism 9 or 10, respectively. Inasmuch as the two crank lever systems are constructed symmetrically in the sense of a mirror reflection, only mechanism 10 need be described.

As shown in Figs. 3 and 5, one leg 12 of a crank lever 11 is linked to the unattached end of rod 8, while the other leg 13 is forked at the end thereof and provided with a cylindrical bushing 14 (Figs. 4 and 6) whereof the bore flares toward both ends in the form of cones. Fulcrum 15 of crank lever 11 rests on an arm 16, the other end of which is swingably or pivotally mounted at fulcrum 17 which is fixed in relation to brace 1. Therefore, the two axles or axes of rotation 15 and 17 are parallel to the longitudinal axis of the vehicle.

Figure 1:
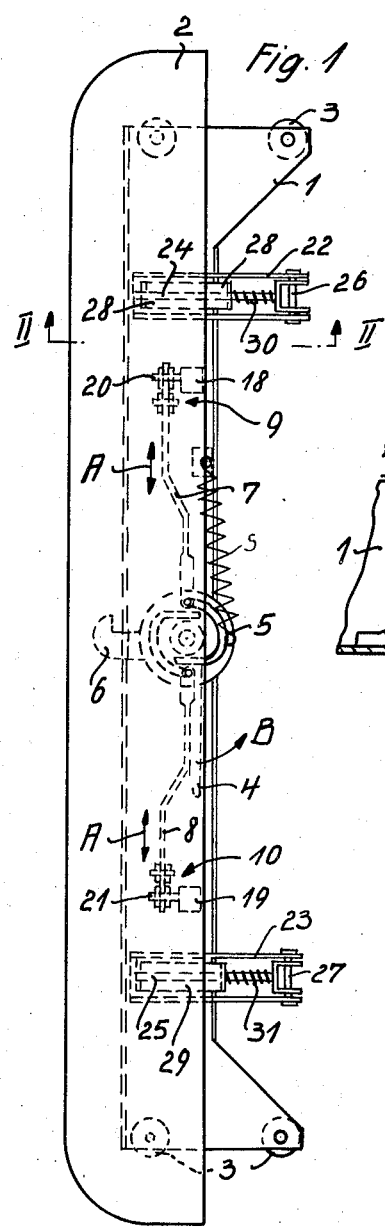
Fig. 1 is a top view of a mechanism in accordance with the invention, the covering attached to the cap not being shown in order to simplify the drawings.

As shown in Fig. 1, cap 2 is provided with spaced supports 18 and 19 for bolts 20 and 21, respectively, which protrude forward and are securely fastened in relation to cap 2. Bolt 21 constitutes a connection between cap 2 and crank lever mechanism 10 by means of bushing 14 as can be seen in detail in Figs. 4 and 6. This connection allows a longitudinal movement of cap 2 relative to bushing 14 and, moreover, a tilt of bolt 21 with the restricted portion of the bore of bushing 14 acting as a bearing or pivot edge.

Figure 2:
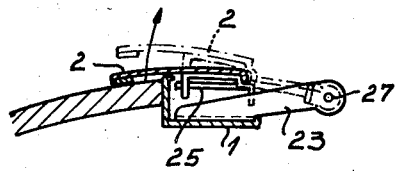
Fig. 2 is a sectional view according to line II—II of Fig. 1.

The mounting of cap 2 on brace 1 is shown in detail in Figs. 7 to 9 considered in conjunction with Figs. 1 and 2. Brace 1 securely supports forked cantilevers 22 and 23. On cantilevers 22 and 23 are provided arms 24 and 25 swingable about pivots 26 and 27, respectively. For the suspension of the cap are provided sliding members 28 and 29 which are securely fastened to cap 2 and which are slidable against the action of springs 30 and 31.

To operate the lock in order to free the sliding top, handle 4 is swung in the direction of arrow B so that hook 6 is released by cam disk 5 and rods 7 and 8 are moved, respectively, toward the outside. A compensating spring S (Fig. 1) may be loaded in the course of this operation so that, when the sliding roof is later closed, it will reduce the required power.

As can be understood, particularly from Figs. 3 and 5, the outward movement of rod 8 (toward the left in these figures) produced by handle 4, will cause a corresponding swing of lever 11 so that leg 13 raises bolt 21 which is securely attached to cap 2 which is thereby raised. However, inasmuch as cap 2 is mounted on cantilevers 22 and 23, it will also swing about pivots 26 and 27. Under normal circumstances, this swinging motion might produce a jamming of the lever system and render the operation of the sliding top more difficult; however, the tapered bore of bushing 14 insures that the tilting movement of the cap is not transferred to the lever system.

In like manner, a force which might be exerted on the cap in a direction parallel to the longitudinal axis of the vehicle by a cover on the sliding roof cannot produce a jam of the levers. This advantage results from the slidable mounting of the cap 2 against the action of springs 30 and 31 to provide for the yielding of the cap in the event of such a force. Moreover, the connection between cap 2 and lever 11 is so designed that the bolt 21, which is attached to the cap, can slide longitudinally in bushing 14 which is connected to knee lever 11, this action depending on the force exerted by the cover. These tiltable and longitudinally movable connecting points between cap 2 and lever mechanisms 9 and 10 only enable a tilting movement and a longitudinal shift of the cap in relation to the ends of the levers connected to the cap. However, they prevent a lateral shift. Therefore, in spite of the swingable mounting of the crank lever fulcrums such as, for example, of pivot 15, a perfect vertical control of the crank lever ends (which are connected to the cap) is attained in the manner of an independent suspension mechanism in that the ends of the two lever systems 9 and 10 are interconnected through cap 2 and their lateral distance is rigidly fixed.

On the other hand, the pivotal mounting of the crank levers 10 and 11 has the advantage that these levers are connected to brace 1 over arms 16 so that the curvature of the vehicle top, which in each individual case is adjusted to the camber of brace 1, will not influence the lever system so that the same lever system may be employed for all kinds of vehicle curvatures without any changes or adjustments.

The invention is not to be considered as limited to the details of the described embodiment, but generally relates to facilitating the operation of sliding roofs.

What is claimed is:

1. A lock for the displaceable roof of a vehicle comprising a brace adapted to abut the frame of the vehicle, a cap having the camber of the top of the vehicle, said cap being adapted for connection to the displaceable roof, a leverage system coupling said cap to said brace and adapted for pivotally moving said cap away from said brace, locking means on said brace for engaging the vehicle, and control means for operating said locking means and actuating said leverage system to control the locking and releasing of the roof with respect to the vehicle.

2. A lock as claimed in claim 1 wherein said control means controls said locking means and leverage system simultaneously.

3. A lock as claimed in calim 2 wherein said brace and cap are positioned transversely to the longitudinal axis of the vehicle, said lock comprising a rotatable disc, control rods coupled to said disc for controlled movement towards and away from said disc, levers for converting the movement of said rods into movements towards and away from said brace, coupling means coupling said levers to said cap, and hinge means coupling said cap to said brace.

4. A lock as claimed in claim 3 comprising bushings on said levers, a pivot in each of said bushings, and a support coupling each of said pivots to said cap.

5. A lock as claimed in claim 4 wherein each bushing defines a bore flaring outwardly in opposite directions from its center to provide a fulcrum for the associated pivot.

6. A lock as claimed in claim 5 wherein said hinge means comprises spaced brackets fixed to said brace, corresponding brackets fixed to said cap, axles supported in said spaced brackets, support rods substantially normal to and pivotable about said axles, said support rods being slidably accommodated in the associated of said corresponding brackets, and springs on said support rods to enable the restricted penetration of said support rods into said corresponding brackets.

7. A lock as claimed in claim 6 comprising crank levers pivotally connected at the ends of said control rods for supporting said bushings and pivotal levers pivotable about axes fixed with respect to said brace, said pivotal levers being coupled to said crank levers and defining therefor a circular path of movement.

8. A lock as claimed in claim 7 comprising a handle connected to said disc for controlling the engagement and disengagement of said roof, and a spring for storing energy in response to the movement of the handle for facilitating the return movement thereof.

9. A lock as claimed in claim 7 comprising rollers mounted on said brace to facilitate movement between said brace and the vehicle.

10. A lock for the displaceable roof of a vehicle compising a brace adapted to abut the frame of the vehicle transversely thereof, a cap having the camber of the top of the vehicle, said cap being adapted for connection to the displaceable roof, a leverage system coupling said cap to said brace and adapted for pivotally moving said cap away from said brace, the cap being pivotally coupled to said leverage system and displaceable with respect to the system longitudinally of the vehicle, the cap being further displaceable with respect to said brace longitudinally of the vehicle, locking means on said brace for engaging the vehicle, and control means for operating said locking means and actuating said leverage system to control the locking and releasing of the roof with respect to the vehicle.

References Cited in the file of this patent

FOREIGN PATENTS

| | | |
|---|---|---|
| 667,875 | France | Oct. 24, 1929 |
| 913,739 | Germany | June 18, 1954 |
| 935,112 | Germany | Nov. 10, 1955 |
| 322,673 | Great Britain | Dec. 12, 1929 |